US011700832B2

(12) United States Patent
Cantwell et al.

(10) Patent No.: US 11,700,832 B2
(45) Date of Patent: *Jul. 18, 2023

(54) ANIMAL BED ASSEMBLY

(71) Applicant: MID-WEST METAL PRODUCTS COMPANY, INC., Muncie, IN (US)

(72) Inventors: Brad Cantwell, Muncie, IN (US); Michael E. Greene, Muncie, IN (US); Terrance L. Jones, Muncie, IN (US); Stew Kerr, Muncie, IN (US)

(73) Assignee: MID-WEST METAL PRODUCTS COMPANY, INC., Muncie, IN (US)

( * ) Notice: Subject to any disclaimer, the term of this patent is extended or adjusted under 35 U.S.C. 154(b) by 282 days.

This patent is subject to a terminal disclaimer.

(21) Appl. No.: 17/128,368

(22) Filed: Dec. 21, 2020

(65) Prior Publication Data

US 2021/0105974 A1 Apr. 15, 2021

Related U.S. Application Data

(63) Continuation of application No. 14/623,974, filed on Feb. 17, 2015, now Pat. No. 10,881,079.

(60) Provisional application No. 61/943,629, filed on Feb. 24, 2014.

(51) Int. Cl.
*A01K 1/035* (2006.01)
*A01K 1/03* (2006.01)

(52) U.S. Cl.
CPC ............ *A01K 1/0353* (2013.01); *A01K 1/034* (2013.01); *A01K 1/035* (2013.01)

(58) Field of Classification Search
CPC ....... A01K 1/0353; A01K 1/034; A01K 1/035
See application file for complete search history.

(56) References Cited

U.S. PATENT DOCUMENTS

| 5,088,139 A * | 2/1992 | Bloom ................... A47D 13/08 190/1 |
| 2003/0075111 A1 | 4/2003 | Greenfield |
| 2005/0011007 A1 | 1/2005 | Lintner |
| 2005/0138730 A1 | 6/2005 | Henry et al. |
| 2012/0318206 A1* | 12/2012 | van Leeuwen ...... A01K 5/0114 248/163.1 |

OTHER PUBLICATIONS

Canadian Office Action, Canadian Intellectual Property Office, Canadian Patent Application No. 2,882,782, dated Apr. 6, 2021, 5 pages.

* cited by examiner

*Primary Examiner* — Christopher D Hutchens
*Assistant Examiner* — Steven J Shur
(74) *Attorney, Agent, or Firm* — Taft Stettinius & Hollister LLP; Stephen F. Rost

(57) ABSTRACT

An animal bed for supporting an animal includes a body having a bottom member and a bolster forming a outer wall of the body. The outer wall is positioned about a perimeter of the bottom member and extends outwardly therefrom to define a recessed area for accommodating the animal. A plurality of straps is coupled to and extending at least partially across the bottom member opposite the recessed area. Each of the plurality of straps includes a degree of elasticity configured to hold a rigid member in contact with the bottom member.

17 Claims, 9 Drawing Sheets

ANIMAL BED ASSEMBLY

RELATED APPLICATIONS

This application is continuation application claiming priority to U.S. patent application Ser. No. 14/623,974, filed Feb. 17, 2015, which claims priority to U.S. Provisional Patent Application Ser. No. 61/943,629, filed Feb. 24, 2014, each of which are incorporated hereby by reference in their entireties.

FIELD OF THE DISCLOSURE

The present disclosure relates to an animal bed, and in particular to an animal bed with an integrated coupler for coupling a rigid member to the animal bed.

BACKGROUND

It is common practice for pet owners and animal lovers to provide a cushioned or textured surface for their pets to sleep or relax on top of. The cushioned or textured surface is often made of a soft material that can create a welcoming and familiar environment for the pet. The cushioned or textured surface often has a cushioned wall surrounding the bottom textured surface. Ideally, the animal bed is primarily composed of soft materials. The walls of the animal bed may have a soft exterior and be internally filled with a stuffing that can both insulate the animal and provide a cushion for additional comfort to the animal.

A soft and comforting environment for the animal often results in an animal bed that is pliable. Further, because the animal is intended to inhabit the bedded area, the animal bed may need to be cleaned frequently. Animal beds that are pliable are ideal for both animal comfort and ease of cleaning. One of the disadvantages of a pliable animal bed is the inability of the animal bed to substantially maintain the correct form when the animal attempts to nest or moves about within the bed. Current animal beds can become disfigured and ineffective because they do not have adequate rigidity to maintain the proper form when experiencing common animal movements.

A need currently exists in the market for an animal bed that will maintain the proper structure and form while still creating a comfortable environment for the animal that can easily be cleaned.

SUMMARY

In one embodiment of this disclosure, an animal bed for supporting an animal includes a body including a bottom member; a bolster forming an outer wall of the body, the outer wall positioned about a perimeter of the bottom member and extending outwardly therefrom to define a recessed area for accommodating the animal; and a plurality of straps coupled to and extending at least partially across the bottom member opposite the recessed area; wherein, each of the plurality of straps includes a degree of elasticity configured to hold a rigid member in contact with the bottom member.

In one example of this embodiment, the bottom member includes a plurality of sides; and each of the plurality of straps includes a first end and a second end, the first end being coupled to one of the plurality of sides and the second end being coupled to another of the plurality of sides. In a second example, at least two of the plurality of sides are coupled to one another to form a corner; and at least one of the plurality of straps is coupled to each of the two sides for holding the rigid member at the corner of the bottom member. In a third example, the plurality of straps extend laterally or longitudinally across the bottom member.

In a fourth example, the plurality of straps form pockets coupled to the bottom member. In a fifth example, the bolster comprises at least a first bolster and a second bolster. In a sixth example, the first bolster and second bolster are disposable in a plurality of positions relative to the bottom member, the plurality of positions including at least an upright position and a substantially planar position. In a seventh example, the plurality of straps are removably coupled to the bottom member.

In another embodiment, a multi-bolster animal bed assembly includes a bottom member having a defined surface area; an outer wall coupled to the bottom member and positioned about the defined surface area; a first bolster and a second bolster forming at least part of the outer wall, where the first bolster is coupled to the bottom member; an interconnecting member coupling the first bolster and second bolster to one another; and a plurality of straps coupled to the bottom member; wherein, the second bolster is movable about the first bolster between a first position and a second position; further wherein, the second bolster is disposed at least partially above the first bolster in the first position, and the second bolster is disposed substantially planar with the first bolster and the bottom member in the second position.

In one example of this embodiment, a rigid member is coupled between the plurality of straps and the bottom member. In a second example, the second bolster is pivotally coupled to the first bolster. In a third example, a third bolster is coupled to the second bolster. In a fourth example, in the first position, the first bolster, second bolster and bottom member define a cavity on a side of the bottom member opposite the plurality of straps. In a fifth example, a portion of at least the second bolster is removed to form an entry to the bed. In a sixth example, the plurality of straps extend laterally or longitudinally across the bottom member. In a seventh example, the plurality of straps form pockets coupled to the bottom member. In an eighth example, the plurality of straps are removably coupled to the bottom member.

In a further embodiment, an animal crate assembly includes a crate including a top wall, a bottom wall, at least one side wall, and a door for providing access to an interior of the crate, the bottom wall having a defined length and width; an animal bed including a bottom member having a defined length and width that form a perimeter thereof; an outer wall coupled to the bottom member and positioned about the defined perimeter; a first bolster portion forming a first part of the outer wall, the first bolster portion being coupled to the bottom member; a second bolster portion forming a second part of the outer wall, the second bolster portion being coupled to the first bolster portion; and a plurality of straps coupled to the bottom member; wherein, the second bolster portion is movable about the first bolster portion between a first position and a second position; further wherein, the second bolster portion is disposed at least partially above the first bolster portion in the first position, and the second bolster portion is disposed substantially planar with the first bolster portion and the bottom member in the second position.

In one example of this embodiment, an interconnecting member couples the first bolster and second bolster to one another. In another example, a rigid member is coupled between the plurality of straps and the bottom member.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
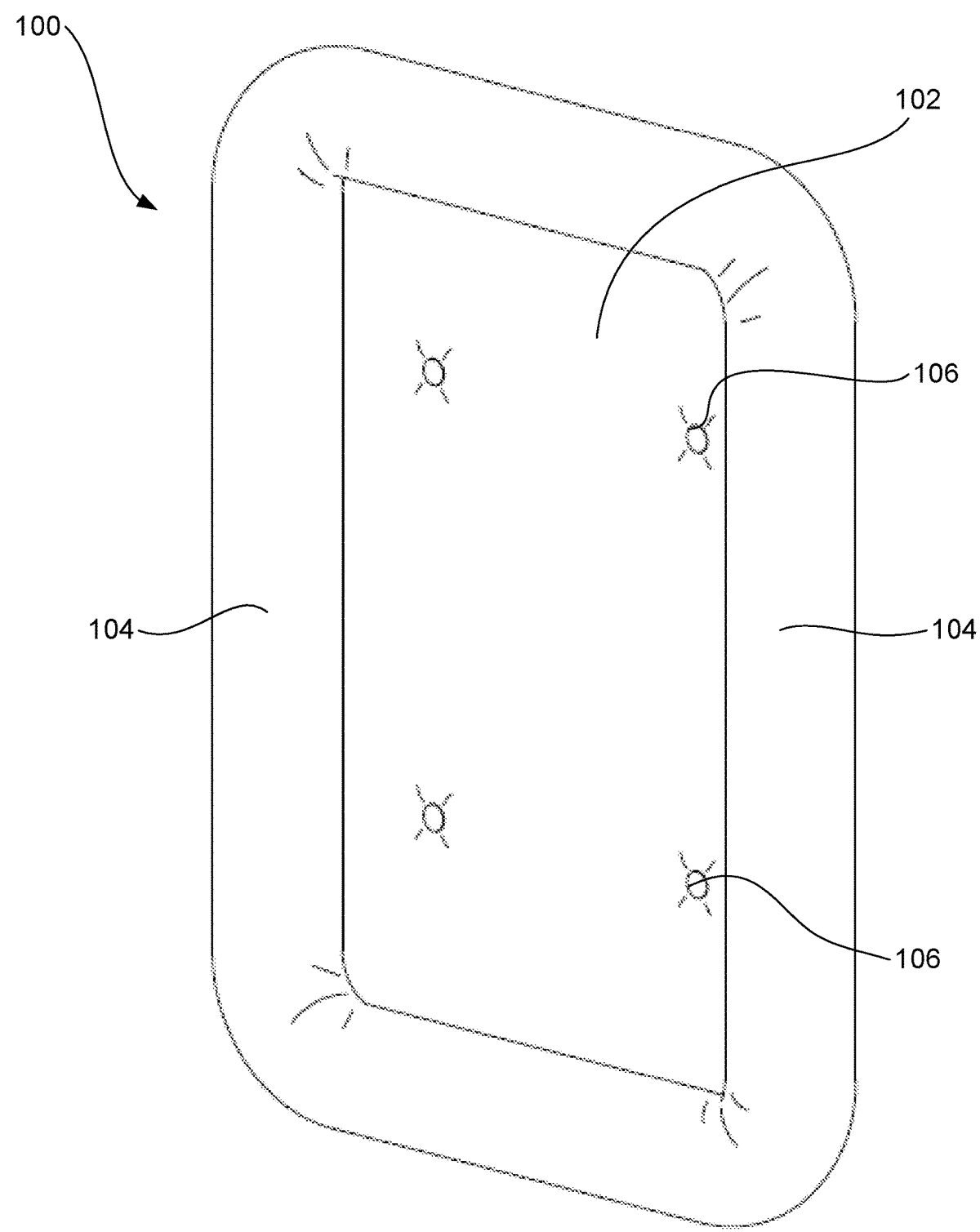
FIG. 1 is a perspective top-side view of the first embodiment of an animal bed.

In FIG. 1, a top-side of an animal bed 100 is shown. The animal bed 100 can include a bottom member 102 that is at least partially surrounded by an outer wall 104. The bottom member 102 can consist of a cavity that may be stuffed with an insulating and cushioning material such as cotton, down, foam, or the like. A plurality of materials may also be used for the bottom member 102 to provide a soft exterior surface that is desirable to an animal when resting. While this disclosure is not limited to any one material, such materials as fleece, silk, cotton, suede, polyester and the like may be used for the exterior of the bottom member 102.

Similar to the bottom member 102, the outer wall 104 may have an external surface made from fleece, silk, cotton, suede, polyester and the like. Alternatively, a vinyl layer may be disposed on a portion of the bottom and sides of the outer wall 104. Buttons 106 or other aesthetic-pleasing features may be incorporated into the bed as ornamental features or for coupling different structure or materials of the animal bed 100. The outer wall 104 may also substantially encompass an outer cavity that may be filled with a stuffing material such as cotton, down, foam or the like. Further, the outer wall 104 can be filled with stuffing material to extend substantially away from the plane defined by the bottom member 102. The outer wall 104 may be coupled to the outer edges of the bottom member 102. When the outer wall 104 is substantially filled with stuffing material, the outer wall 104 and the bottom surface 102 may create a bowl-like structure. The outer wall 104 may have a cylindrical cross-section (not shown).

Although not shown, there may be a portion of the outer wall that has a reduced height or gap defined in the outer wall for providing an entry onto and exit from the animal bed 100. This may be particularly true for an animal bed 100 that has outer walls with an increased height to form a more enclosed or bowl-like structure.

Figure 2:
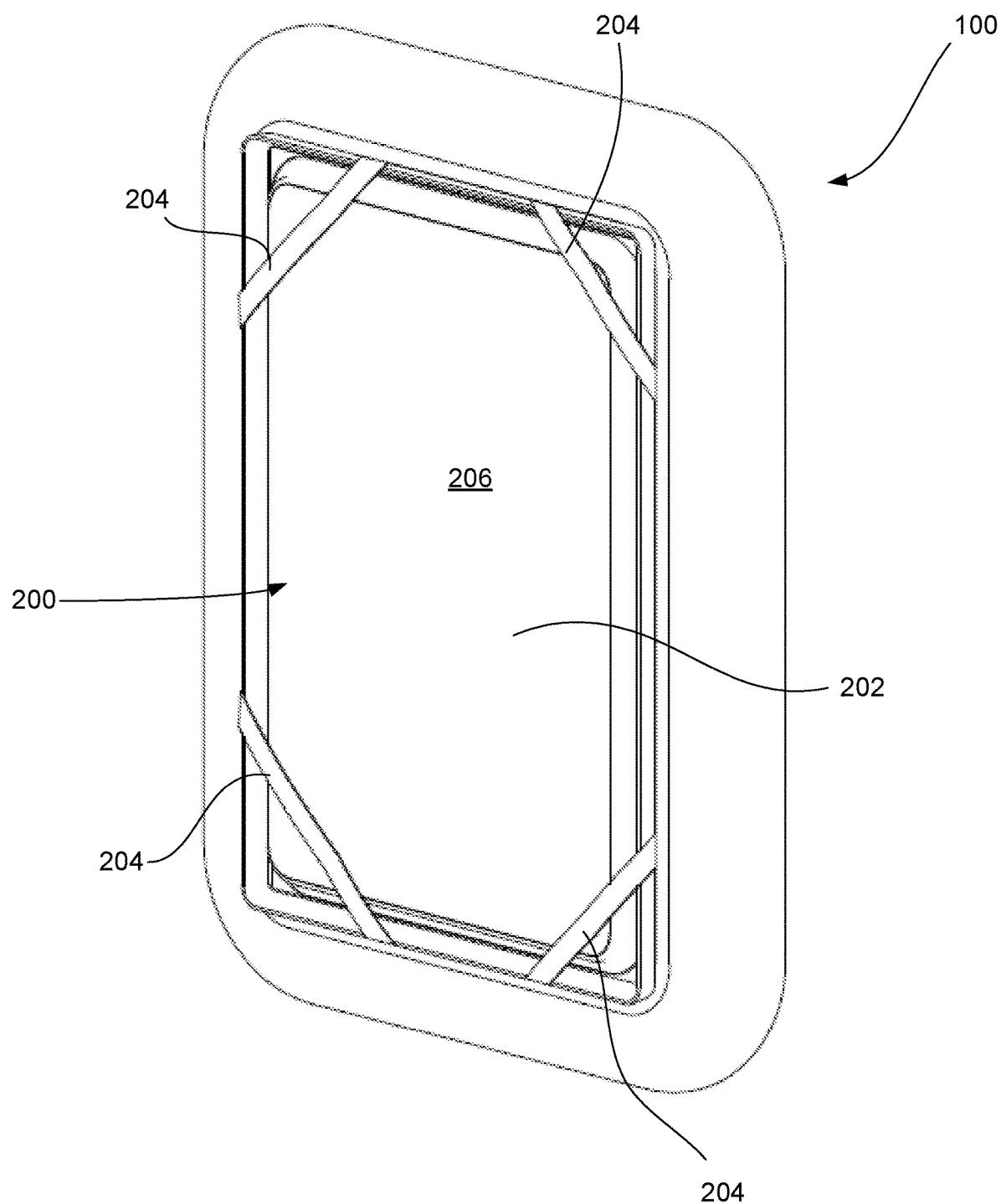
FIG. 2 is a perspective bottom-side view of the animal bed of FIG. 1 coupled to a rigid member.

Referring to FIG. 2, a bottom side 200 of the bottom member 102 of FIG. 1 is shown. The illustrated embodiment of FIG. 2 represents one of many possible embodiments of the animal bed 100. As previously described, it can be desirable to position or align a pan or other rigid member to the bottom side 200 of the animal bed 100, particularly when the bed is disposed in a cage, crate, or other enclosure. In FIG. 2, the bottom side 200 of the animal bed 100 may at least partially encompass a rigid member 202. The rigid member 202 can correspond with the planar dimensions of the bottom member 102 to occupy substantially the same footprint or surface area as the bottom member 102. The rigid member 202 may be formed of a plurality of different types of materials that can substantially retain its shape such as plastic, metal, or wood. Further, in one embodiment, the bottom member 102 and the rigid member 202 may be sized to fit within a cage structure to allow the animal bed 100 to be located within a cage.

Although not shown, an animal cage or crate may include at least a top wall, a bottom wall, one or more side walls, and a door for providing egress and ingress to an interior of the cate or crate. The bottom wall of the cage or crate may have a defined length and width, which may be sized similar to that of the top wall. Each wall and door of the cage or crate may be formed of interconnected horizontal and vertical wires. Alternatively, each wall may be formed of a plastic. There may be windows or other openings formed in the walls of the cage or crate. In this disclosure, any size of cage or crate is contemplated. The size of the bottom member 102 of the animal bed 100 may correspond with the length and width of the bottom wall of the cage or crate.

The rigid member 202 may be removably coupled to the pet bed 100 by one or more straps 204. There may be as many straps 204 as there are corners formed by the rigid member 202. The straps 204 may be formed of an elastic material that allows the straps 204 to be stretched to allow the rigid member 202 to be removably coupled to the animal bed 100. When the rigid member 202 is removably coupled to the animal bed 100, the straps 204 can be located across an exterior surface 206 of the rigid member 202 while the interior surface (not shown) of the rigid member 202 is positioned against the bottom member 102. In the embodiment shown in FIG. 2, when the rigid member 202 is removably coupled to the animal bed 100, the bottom member 102 is substantially aligned with the rigid member 202.

Figure 3:
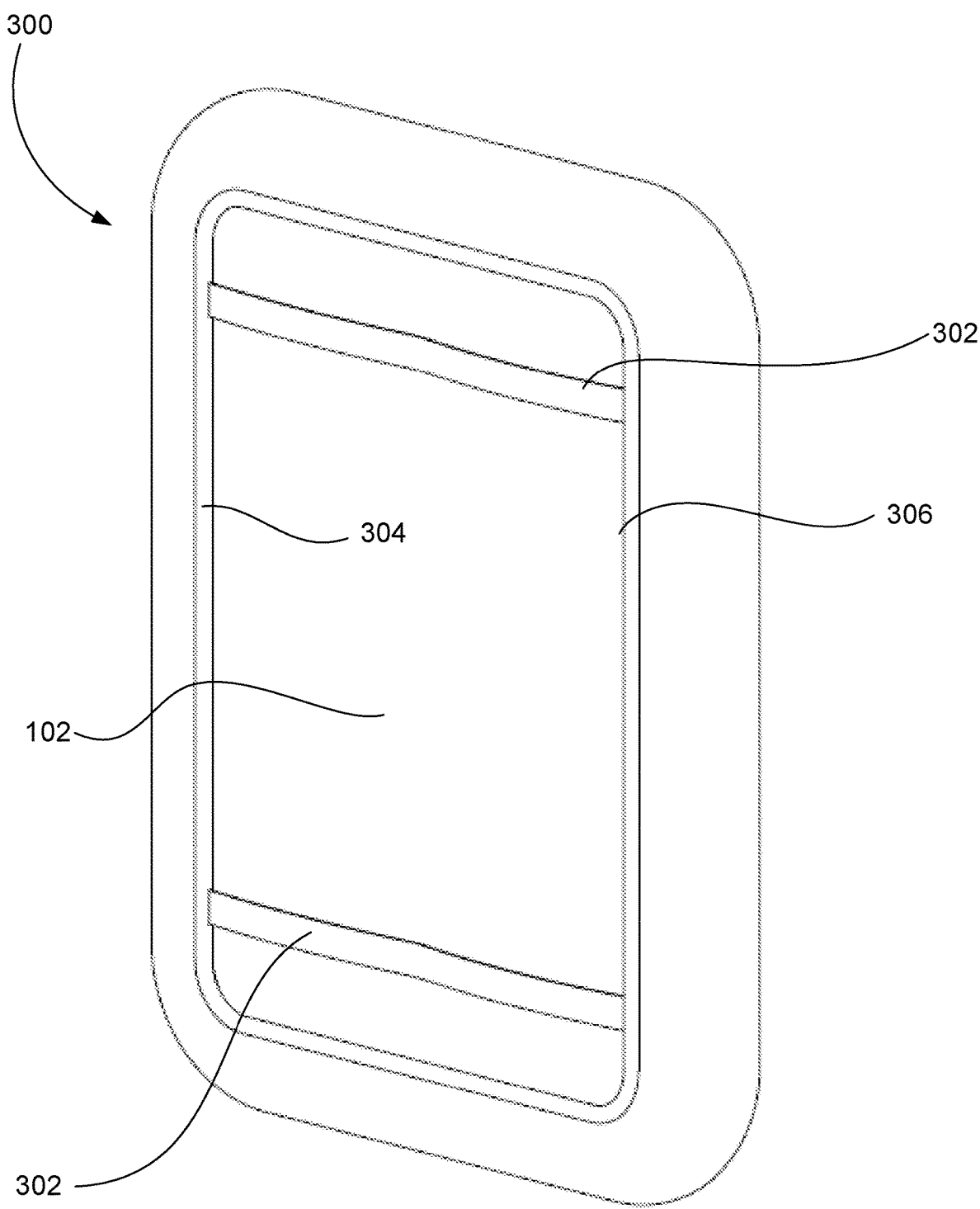
FIG. 3 is a perspective bottom-side view of a second embodiment of an animal bed without a coupled rigid member.

In FIG. 3, another embodiment of the bed 300 is shown without a rigid member coupled thereto. This embodiment utilizes one or more straps 302 to removably couple the bed 300 to a rigid member (not shown). There may be any number of straps 302 that may be parallel to and spaced from one another. The straps 302 may be coupled to the bottom member 102 at a first edge 304 and a second edge 306. The first edge 304 may include one outer edge of the bottom member 102 and the second edge 306 may include a second edge of the bottom member 102 that is parallel to the first edge 304. The straps 302 may allow a rigid member (not shown) to be removably coupled to the animal bed 300 when the rigid member is disposed between the straps 302 and the bottom member 102. When a rigid member is removably coupled to the animal bed 300, the straps 302 may substantially restrict the rigid member from becoming misaligned with the footprint of the bottom member 102. As shown, the straps in FIG. 3 extend approximately the width of the bottom 102 of the bed 300.

Figure 4:
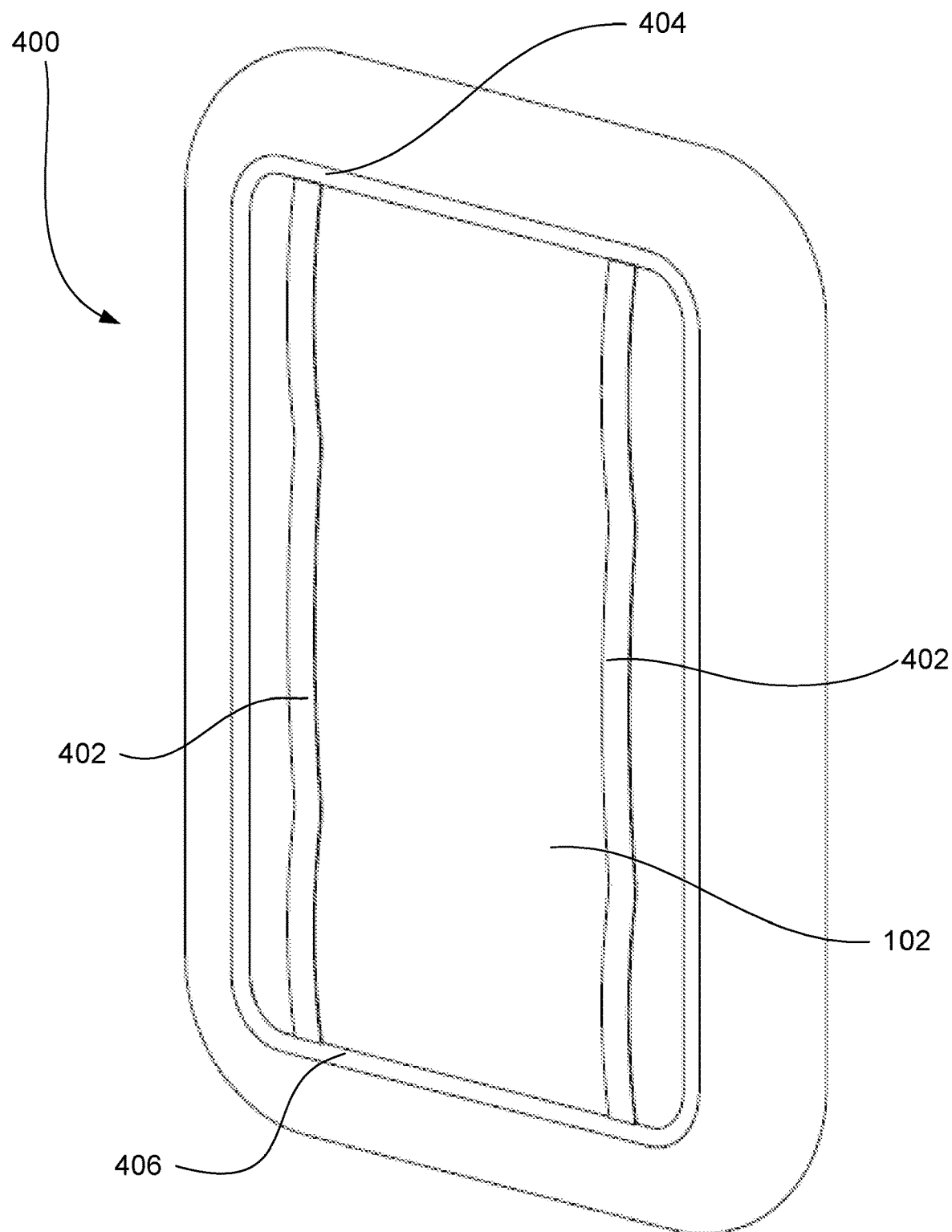
FIG. 4 is a perspective bottom-side view of a third embodiment of an animal bed without a coupled rigid member.

In yet another embodiment shown in FIG. 4, straps 402 may be utilized to removably couple an animal bed 400 to a rigid member (not shown). The straps 402 can be substantially parallel to one another and there can be any number of straps 402. Further, the straps 402 can be spaced apart from one another in a plurality of configurations. Each strap 402 can be coupled to the bottom member 102 at both a first edge 404 and a second edge 406, and extend approximately the length of the bottom member 102. The first edge 404 may include of one outer edge of the bottom member 102 and the second edge 406 may include of a different outer edge of the bottom member 102. The rigid member may be disposed between the straps 402 and the bottom member 102 for coupling the rigid member to the animal bed 400, and also to substantially align the rigid member with the bottom member 102. When a rigid member is removably coupled to the animal bed 400, the straps 402 may substantially restrict the rigid member 202 from becoming misaligned with the bottom member 102.

While various embodiments of straps have been described, the present disclosure is not limited to any of the aforementioned configurations. For example, other types of straps including diagonally-oriented straps, a combination of widthwise and lengthwise straps, offset straps, or a pocket may be used to removably couple a rigid member to an animal bed. Further, while the illustrated embodiments provide substantially rectangular animal bed configurations, this disclosure is applicable to animal beds having cross-sections shaped circular, triangular, oval, and any other shaped configuration.

Moreover, the particular material of the straps described in this disclosure can be formed of a plurality of fabrics and materials to achieve the result of removably coupling a rigid member. Such fabrics and materials as elastic bands, canvas, rubber, cotton, fleece, nylon, and the like may be used for the straps.

Figure 5:
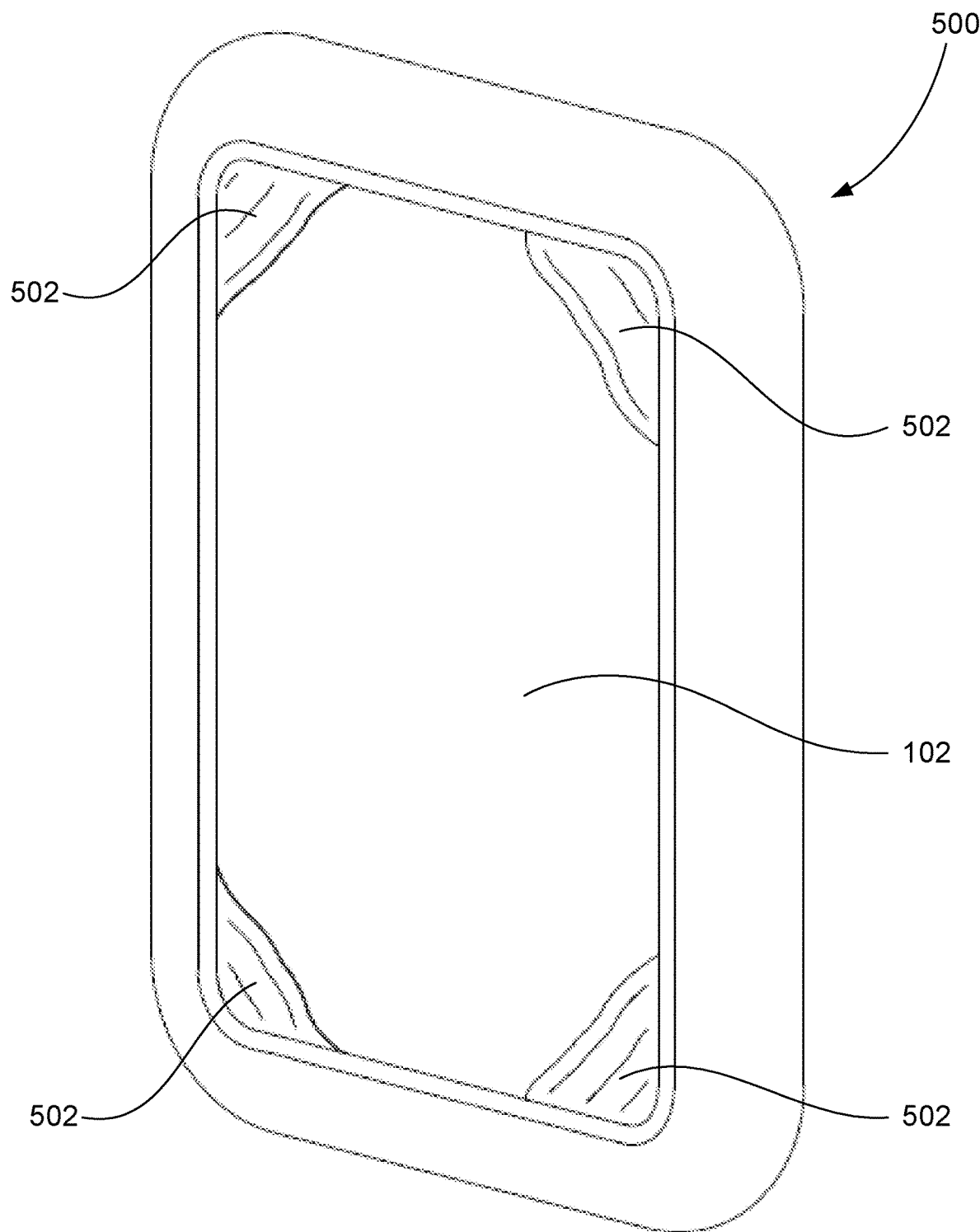
FIG. 5 is a perspective bottom-side view of a fourth embodiment of an animal bed without a coupled rigid member.

Another embodiment is shown in FIG. 5. Here, an animal bed 500 may include one or more pockets or sleeves 502 to removably couple a rigid member (not shown) to the animal bed 500. The bed 500 can include any number of pockets 502. The one or more pockets 502 may be located at any corner, side, or edge of the bottom member 102. The pockets 502 can allow for sufficient deformation so that the rigid member may be removably coupled to the pockets 502. In one embodiment, a rigid member that has four corners can be coupled to the animal bed 500 via four pockets 502 located at each of the four corners of the bed 500. The pockets 502 can be sufficiently sized to allow for the pockets 502 to substantially encompass and retain a corner or edge of the rigid member when the rigid member is removably coupled to the animal bed 500. Further, when the animal bed 500 is removably coupled to the rigid member, the rigid member may be substantially retained in alignment with the footprint or surface area of the bottom member 102. Other variations of the embodiment of FIG. 5 may include a sleeve that is formed along the length or width of the bottom member 102 such that the rigid member can be disposed in the sleeve and retained or coupled to the animal bed 500. In other embodiments, there may be a plurality of sleeves for retaining the rigid member to the bed.

As noted above, the rigid member can include a pet pan, a substantially flat piece of material that adds rigidity to the bed, or other structure that is substantially flat and includes a size and shape similar to that of the animal bed.

Figure 6:
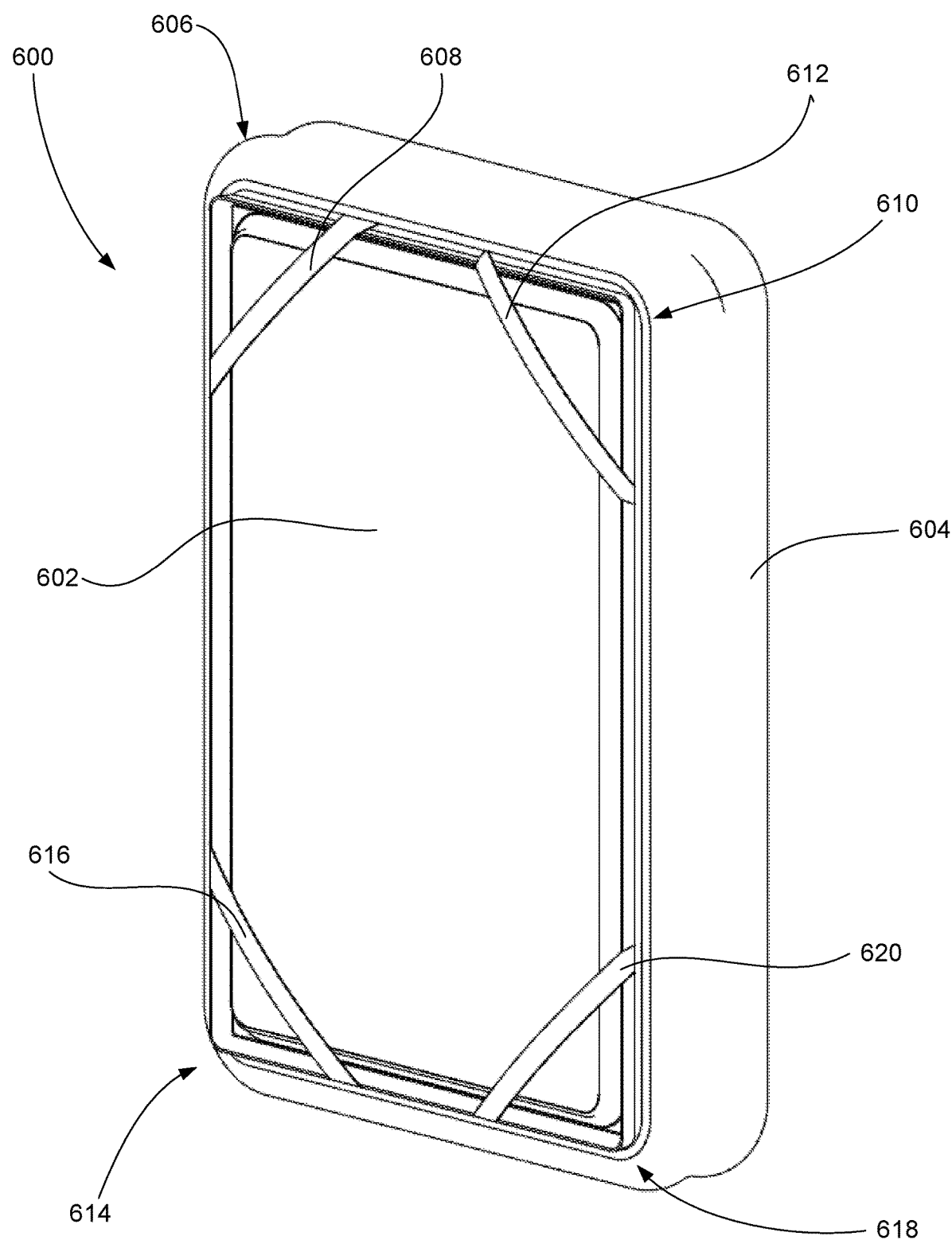
FIG. 6 is a perspective view of an embodiment of a multi-bolster animal bed.
Figure 7:
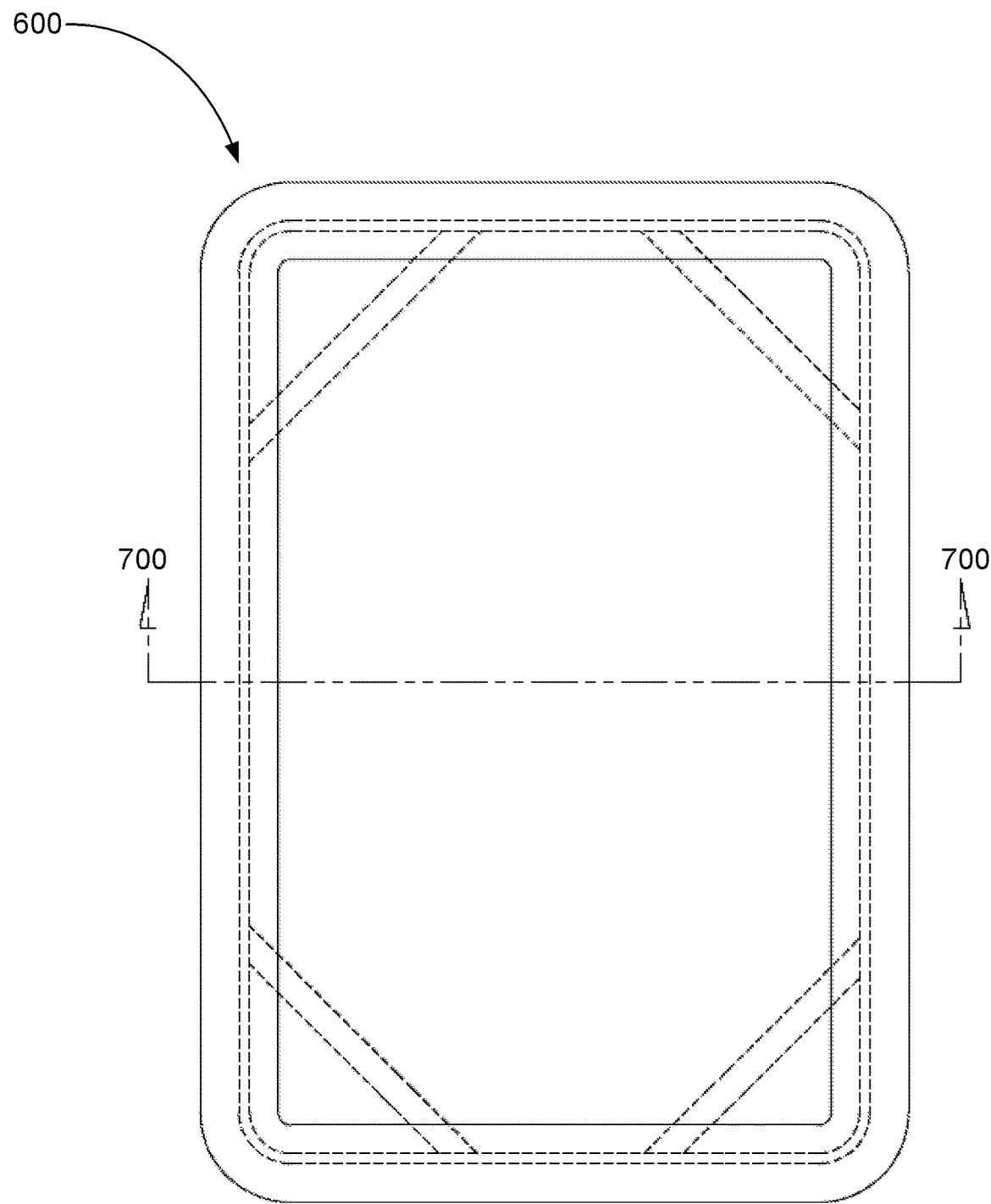
FIG. 7 is a bottom view of the animal bed of FIG. 6.

A different embodiment of an animal bed is shown in FIGS. 6-8. In FIG. 6, a multi-bolster animal bed assembly 600 is provided for an animal. The multi-bolster bed assembly 600 of FIG. 6 can include an animal bed 604 removably coupled to a rigid member 602 such as a mat, plate, tray, pan, etc. For instance, the rigid member 602 can be made of plastic, metal, vinyl, or other material. The bed 604 can include a bottom surface that can be coupled to the rigid member 602. In FIG. 6, a plurality of straps are shown for coupling the bed 604 to the rigid member 602. For instance, the bed 604 is shown as including four corners, i.e, a first corner 606, a second corner 610, a third corner 614, and a fourth corner 618. In this manner, the bed 604 can have a square or rectangular shape. This is not required, however, and the bed 604 can be substantially round, triangular, pentagonal, hexagonal, octagonal, or any number of sides. In at least one example, the size and shape of the animal bed 604 can correspond with the size and shape of the rigid member 602. For instance, the perimeter or circumference of the rigid member can be substantially the same as the perimeter or circumference of the animal bed 604. This, however, is not required in all embodiments.

In the illustrated embodiment of FIG. 6, the first corner 606 of the animal bed 604 can include a retaining strap 608. The strap 608, for example, can be made of a cloth-like material that includes a degree of elasticity. The elasticity of the strap may vary depending on the size of rigid member being retained and the size of the animal bed. The strap 608 can further include a first end and a second end, where the first end is coupled to one side of the animal bed 604 and the second end is coupled to another side thereof. The strap ends can be sewn to the sides of the animal bed 604, or the strap ends may be removably coupled to the sides (e.g., via a Velcro or snap-like connection). The strap 608 can be pulled such that a corner or edge of the rigid member 602 can be disposed between the bottom surface of the animal bed and the strap 608. In this arrangement, the strap 608 can couple the rigid member 602 to the animal bed 604.

Similarly, the second corner 610 of the animal bed 604 can include a second strap 612, the third corner 614 can include a third strap 616, and the fourth corner 618 can include a fourth strap 620. The combination of each of the four straps, when coupling the rigid member 602 to the animal bed 604, provide a coupling mechanism for substantially maintaining the rigid member 602 to the bottom surface of the animal bed 604.

Figure 9:
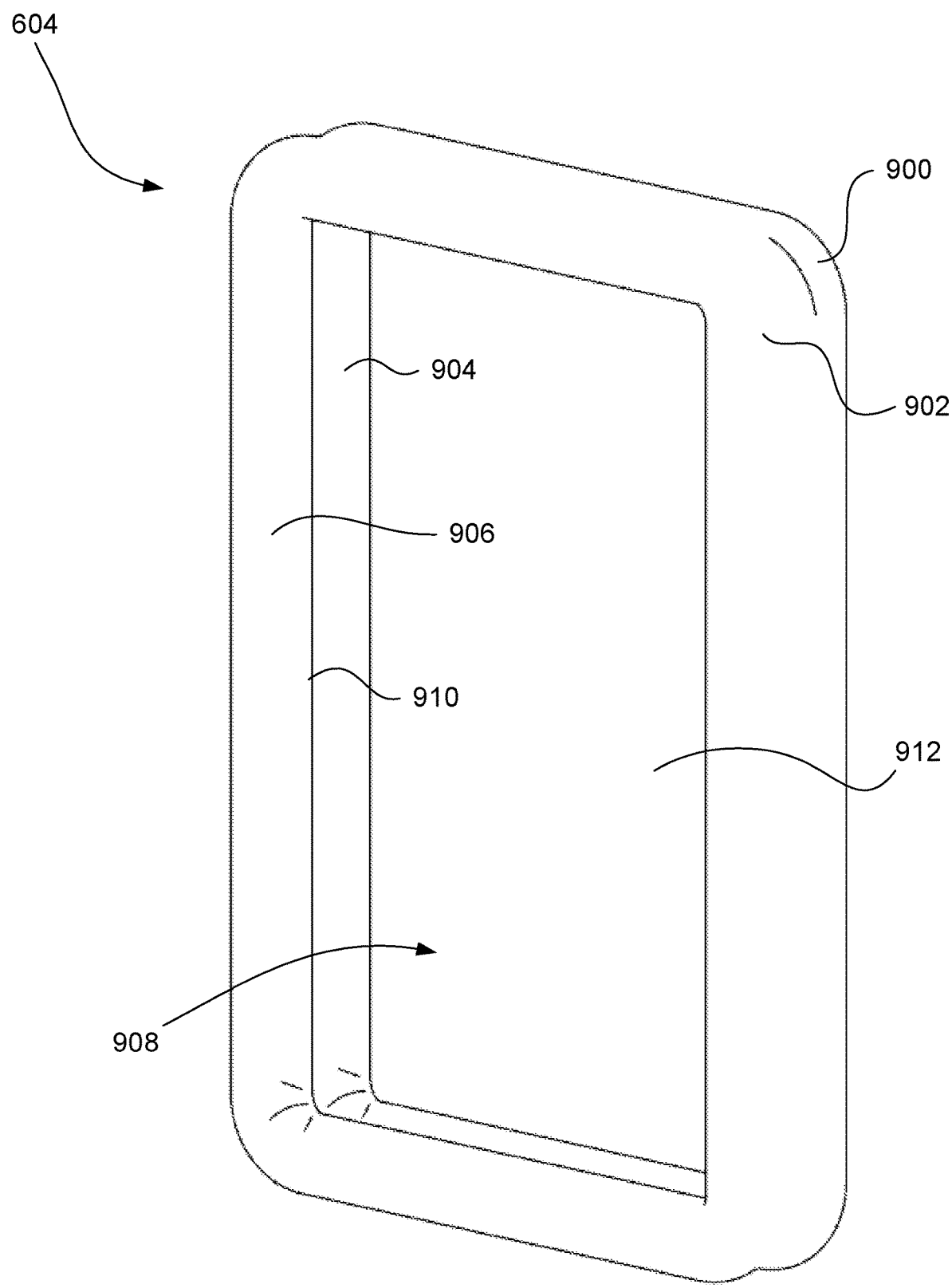
FIG. 9 is a top perspective view of a multi-bolster animal bed.

The multi-bolster animal bed assembly 600 can also provide a safe and secure bed for an animal to rest. As shown in FIG. 9, the animal bed 604 can include a bottom inner surface 912, a top surface 914, a first inner wall 904 and a second inner wall 906. The first inner wall 904 and second inner wall 906 may form an inner perimeter or circumference that defines an inner region of the bed 604. The inner region may be further defined by a recessed area 908 in which an animal may rest. The first inner wall 904 and second inner wall 906 may be joined to one another at a seam 910.

The outer walls may be formed by a first bolster portion 900 and a second bolster portion 902. The first bolster portion 900 may be disposed towards the bottom of the bed and the second portion 902 may be disposed towards the top of the bed. In one aspect, the first bolster portion 900 may be coupled to the bottom member 102 of the bed. In another aspect, the first bolster portion 900 may be spaced from the bottom member 102. In this embodiment, the first bolster portion 900 and first inner wall 904 may form substantially the same portion of a side wall of the bed, and likewise the second bolster portion 902 and second inner wall 906 may form substantially the same portion of the side wall.

Figure 8A:
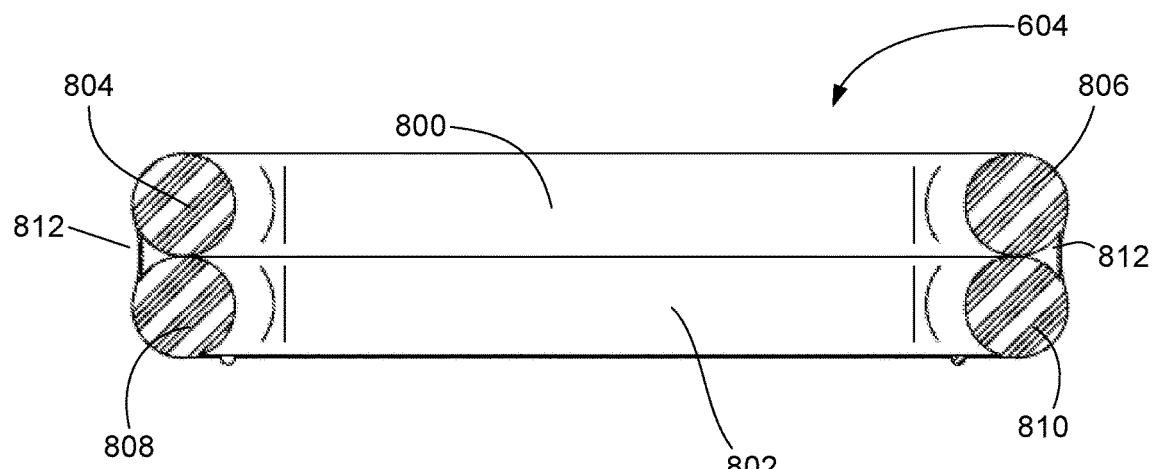
FIG. 8A is a first cross-sectional view of the animal bed of FIG. 7 taken along lines 700-700.

The multi-bolster animal bed 604 of FIG. 6 is configurable between an upright position and a substantially flat position, and any position therebetween. This is best shown in FIGS. 7 and 8. Referring to FIG. 8A, for example, the animal bed 604 can be formed to include an upper portion 800 and a lower portion 802. In one example, the upper portion 800 and lower portion 802 can be substantially the same shape and size. In another example, the lower portion 802 can be larger than the upper portion 800. In FIG. 8A, for example, the upper portion 800 is in its raised or upright position such that the animal bed 604 has a smaller cross-sectional area and can be positioned within an animal crate (not shown). The upper portion 800 can be positioned along the inner side walls of the crate to provide greater comfort to the animal. The lower portion 802 can include the plurality of straps for coupling the animal bed 604 to the rigid member 602.

As shown in FIG. 8A, the upper portion 800 and lower portion 802 can include an outer bolster that fits about the perimeter thereof. For example, the upper portion 800 can include an upper bolster that is shown having a first end 804 and a second end 806. Likewise, the lower portion 802 can include a lower bolster having a first end 808 and a second end 810. Although each of the upper and lower bolsters are shown having a first end and a second end, the bolsters can be a continuous body that encircles (e.g., a circular shaped bed) or surrounds the outside of the animal bed 604. The bolsters can form the outer wall of the animal bed 604. In the embodiment of FIG. 1, a similar bolster can be used for forming the animal bed but only a single bolster is shown.

Although not shown in great detail, each bolster can be formed by an outer layer of material that surrounds a cushion-like material. For example, foam, cotton, or other cushion-like material can be positioned within the outer material. The bolster can form a circular cross-section as best shown in FIG. 8A. In other embodiments, each bolster of the double bolster assembly 600 can form a different shaped cross-section (e.g., square, rectangular, oval, triangular, etc.). In any event, the outer layer of each bolster can define an inner region that is filled with cushion-like material such that the bolster provides a sturdy outer wall of the animal bed 604.

The upper portion 800 and lower portion 802 can be movably coupled to one another via an interconnecting member 812. The interconnecting member 812 can be formed as a seam in the animal bed 604, or a snap, Velcro®, or other connecting mechanism can be used. The interconnecting member 812 may enable the upper portion 802 to pivot or slide with respect to the lower portion 802. Alternatively, an interconnecting member 812 may not be used in other embodiments where the upper portion 800 is coupled directly to the lower portion 802. In this alternative embodiment, the upper portion 800 may pivot about the lower portion 802 to achieve positions similar to those shown in FIGS. 8A-C and described below.

Figure 8B:
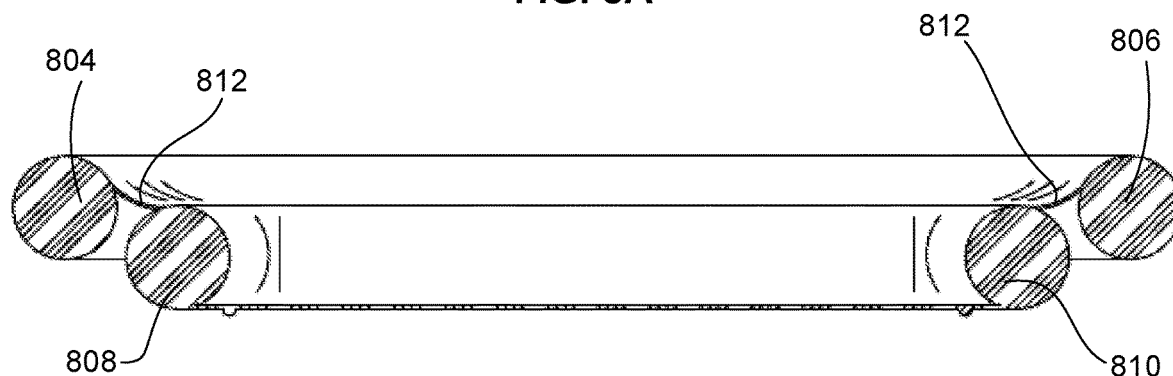
FIG. 8B is a second cross-sectional view of the animal bed of FIG. 7 taken along lines 700-700.
Figure 8C:
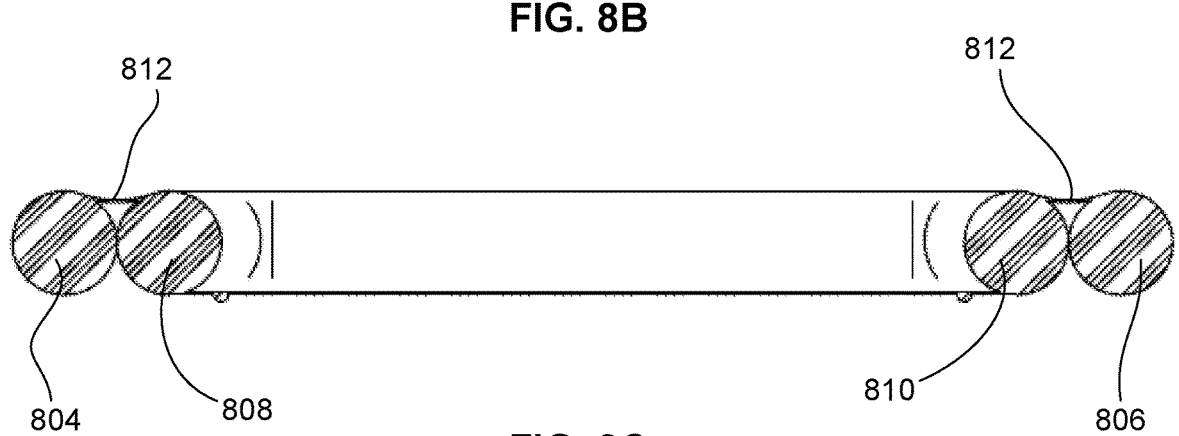
FIG. 8C is a third cross-sectional view of the animal bed of FIG. 7 taken along lines 700-700.

Referring to FIGS. 8B and 8C, the upper portion 800 of the animal bed 604 can be moved from the upright position (FIG. 8A) to a substantially flat or planar position (FIG. 8C).

The term "substantially" refers to an embodiment where the bolsters have a thickness greater than the thickness of the bottom member. As such, the bolsters may be aligned in this position with the bottom member in a way that the bottom member may be disposed in the same plane as each bolster. This is different from FIG. 8B, where the upper bolster is disposed at least partially above the lower bolster, and thus out of the plane defined by the bottom member. In any event, the animal bed 604 can be configured in the substantially flat or planar position or a position therebetween, and as such the animal bed 604 can be configured to fit within an animal crate of different sizes. For a smaller crate, the animal bed 604 can be disposed in the upright position of FIG. 8A. For a larger crate, the animal bed 604 can be disposed in the substantially flat position of FIG. 8C. For crates of sizes in between, the upper portion 800 of the animal bed 604 can be moved to a position similar to that of FIG. 8B.

To reconfigure the animal bed 604, the upper portion 800 can roll or slide along the lower portion 802 between the upright and substantially flat positions.

In FIG. 6, the multi-bolster animal bed assembly 600 is illustrated as a double bolster bed (i.e., includes two bolsters). This disclosure, however, contemplates a multi-bolster animal bed assembly having two or more bolsters. For example, in an animal bed with at least three bolsters, an intermediate or middle portion can be disposed between the upper portion and lower portion. Additional bolsters may allow sidewalls of the animal bed to be disposed in upright positions within a crate to provide protection and comfort to a crated animal.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claim.

The invention claimed is:

1. An animal bed for supporting an animal, comprising:
   a body including a bottom member having outer edges, the bottom member defining a surface upon which the animal rests;
   a rigid member including a substantially flat piece of rigid material, wherein the rigid member is positioned in contact with the bottom member, wherein the rigid member includes one of a mat, a plate, a tray, or a pan, and wherein the rigid member is configured to provide rigidity to the animal bed;
   a first bolster that at least partially forms an outer wall of the body that is positioned about a perimeter of the bottom member and extends outwardly from the surface upon which the animal rests to at least partially define a recessed area for accommodating the animal, wherein the outer wall is coupled to the outer edges of the bottom member; and
   a second bolster that is configured to be at least partially positioned above the first bolster relative to the surface and to cooperate with the first bolster to form the outer wall of the body; and
   wherein the second bolster is movable relative to the first bolster between an upright position, in which the second bolster is positioned at least partially above the first bolster relative to the surface, and a substantially flat position, in which the second bolster is positioned substantially beside the first bolster.

2. The animal bed of claim 1, further comprising a plurality of straps extending at least partially across the bottom member opposite the recessed area.

3. The animal bed of claim 2, wherein each strap of the plurality of straps has a degree of elasticity configured to hold the rigid member in contact with the bottom member such that the rigid member is removably coupled to the body.

4. The animal bed of claim 1, wherein the first bolster is positioned about the entire perimeter of the bottom member.

5. The animal bed of claim 1, wherein:
the bottom member includes a plurality of sides; and
each of the plurality of straps includes a first end and a second end, the first end being coupled to one of the plurality of sides and the second end being coupled to another of the plurality of sides.

6. The animal bed of claim 1, wherein:
at least two of the plurality of sides are coupled to one another to form a corner of the bottom member; and
at least one of the plurality of straps is coupled to each of the at least two sides for coupling the rigid member to the bottom member at the corner of the bottom member.

7. The animal bed of claim 1, wherein the plurality of straps form pockets coupled to the bottom member.

8. The animal bed of claim 1, wherein at least one strap of the plurality of straps is removably coupled to the rigid member.

9. The animal bed of claim 1, wherein:
the first bolster surrounds the perimeter of the bottom member;
when the second bolster is in the substantially flat position relative to the first bolster, the second bolster surrounds the first bolster; and
movement of the second bolster relative to the first bolster between the upright position and the substantially flat position adjusts a perimeter of the animal bed.

10. The animal bed of claim 1, wherein the first bolster includes a cushion-like material and an outer layer of material that surrounds the cushion-like material.

11. The animal bed of claim 1, wherein the bottom member includes a cavity defined therein.

12. The animal bed of claim 11, further comprising a cushioning material, wherein the cavity of the bottom member is filled with the cushioning material such that the cushioning material is disposed between the surface and the rigid member to provide comfort to the animal.

13. The animal bed of claim 1, wherein the first bolster and the second bolster each have a thickness greater than a thickness of the bottom member.

14. The animal bed of claim 1, further comprising:
at least one additional bolster configured to cooperate with the first bolster and the second bolster to form the outer wall of the body.

15. The animal bed of claim 1, wherein when the second bolster is in the upright position, the second bolster is positioned fully above the first bolster relative to the surface.

16. The animal bed of claim 1, wherein the first bolster and the second bolter are joined together at a seam.

17. The animal bed of claim 1, further comprising an interconnecting member coupled to each of the first bolster and the second bolster to facilitate movement of the second bolster relative to the first bolster.

* * * * *